Sept. 11, 1928.
O. L. INGRAM
1,684,031
AIR SUPPLY SYSTEM
Filed March 12, 1926
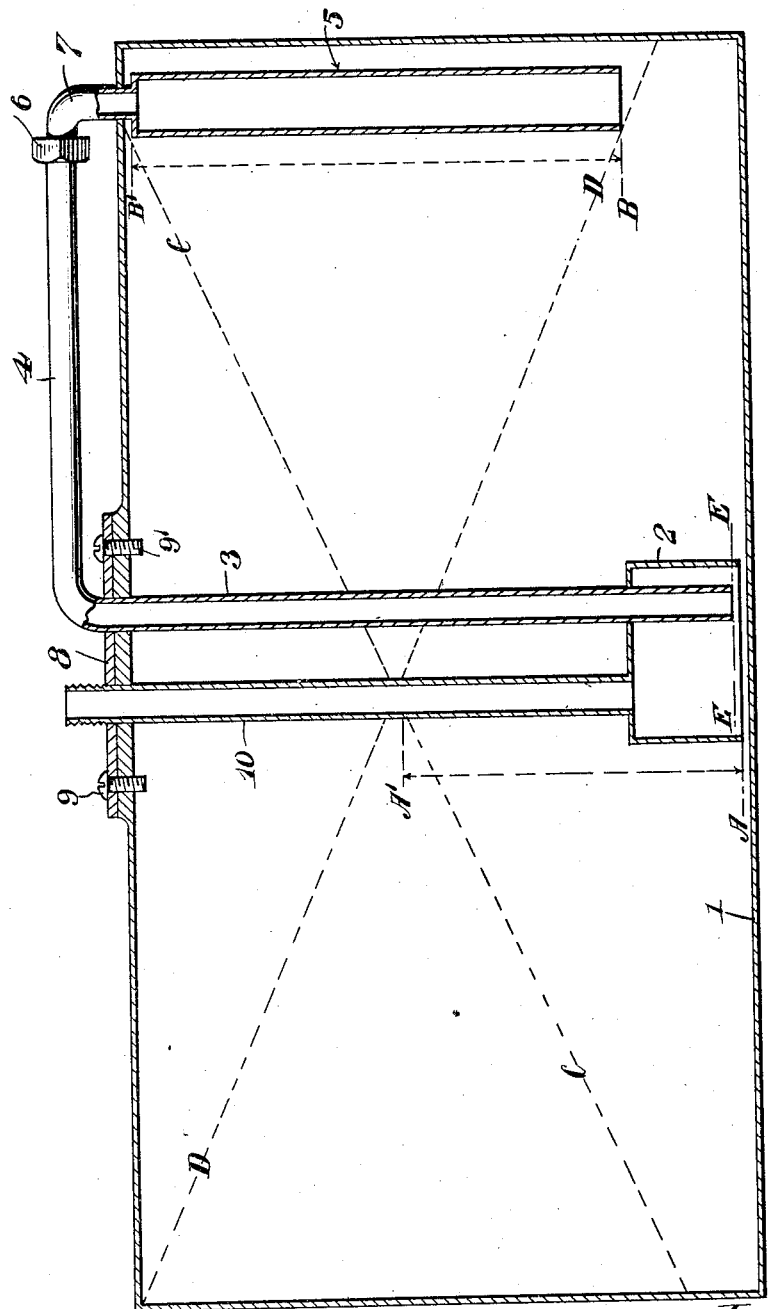
Inventor:
Oscar L. Ingram Patented Sept. 11, 1928.

1,684,031

UNITED STATES PATENT OFFICE.

OSCAR L. INGRAM, OF WALLA WALLA, WASHINGTON.

AIR-SUPPLY SYSTEM.

Application filed March 12, 1926. Serial No. 94,283.

My invention relates more particularly to an air supply system for supplying air to liquid level gauges, such as I have described in my application for Letters Patent, filed December 29, 1923, which application bears Serial Number 683,277. One of the objects of my invention is to supply new air to the air-bell of such gauges in case some of the original air has leaked out for any reason. Another object is to overcome errors caused by changes of temperature.

The invention consists of the pipe 3 and the pipe 5, which two pipes are connected by the pipe line 4. The device is intended to be associated with the ordinary and well known air-bell 2 and its pipe 10, as shown in Fig. 1. The whole assembly including the air-bell 2, its pipe 10; the pipe 3, the pipe 5 and the connecting pipe 4, are associated with an ordinary fuel tank 1, as shown in Fig. 1. The pipe 7 is preferably attached to one end of the fuel tank 1, as shown. It may be brazed in the fuel tank, or it may be attached in any other convenient manner. The air-bell 2, its pipe 10 and the pipe 3 are made in the form of a single unit that is air-tight except that air is free to pass to and from the bell 2 through the pipe 10 and air is also free to pass from the pipe 7 through the pipe 4 and the pipe 3 to the bell 2.

The air-bell 2 and pipes 10 and 3 may be attached to the tank 1 by means of the plate 8 and the screws 9' and 9''. The pipes 10 and 3 may be attached to this plate 8 in any convenient manner, such as soldering or brazing. As shown, the pipe 5 may be attached at the point 7 by soldering or brazing or by any other convenient method. I prefer to attach the pipe 4 to the pipe 5 by means of the threaded coupling 6 as shown in Fig. 1.

It will, of course, be understood that the air-line from the pressure gauge will attach to the pipe 10 by means of the threads 11, or by any other convenient manner.

Fig. 1 is a sectional view of an ordinary fuel tank showing the manner in which my air supply system would be used in an ordinary fuel tank such as carried by automobiles.

I will now describe the manner in which my device operates: In devices such as I have described in my application No. 683,277 it is necessary to keep the gasoline or other fuel low in the air-bell, and to accomplish this it is necessary to keep constantly in the air-bell and connected pipe lines a uniform supply of air, because if the air escapes the liquid will rise in the air-bell 2 and pipe 10, and the gauge will register incorrectly. It is a well known fact that when the driver of an automobile drives the car around a corner the fuel in the fuel tank rushes more or less freely from one end of the tank to the other, thus raising and lowering the hydraulic head of the liquid at the end of the tank, while the hydraulic head of the liquid near the center of the tank remains substantially the same when such corner is rounded. In my device I utilize this principle.

I will now describe completely the manner in which my device operates. We will assume that such a gauge as is described in my former application, No. 683,277, is attached to the pipe 10, shown in Fig. 1, and is to be operated by the liquid rising in the air-bell 2, and we will assume for the purposes of illustration that the air has to some extent leaked out of the air line running from such gauge to the pipe 10, thus allowing the liquid in the tank to rise up in the air-bell to a greater or less extent. We will also assume that the fuel tank is about one-half full of liquid. Now it will be readily understood that if we drive the car carrying the fuel tank around a corner the fuel will be splashed to in one direction the fuel will be splashed to a position somewhat similar to the line D D in Fig. 1. This will allow the fuel to drop out of pipe 5 and a quantity of air will enter this pipe 5. Then when a corner is turned in an opposite direction the fuel will assume a position similar to that shown by the line C C in Fig. 1. Thus the hydraulic head of the liquid between B B will be greater than that between A A and air will thus be forced through the pipe 4 and the pipe 3, thus displacing a small quantity of the fuel in the air-bell 2, while the air thus forced into the air-bell 2 will rise to the surface of the liquid in the pipe 10. Thus each time a succession of corners are rounded, as above described, a small amount of air is forced into the air-bell 2, and when a sufficient amount of air has thus been forced into the air-bell 2, to displace practically all of the liquid from the air-bell 2, any additional air then forced into the air-bell 2 in the manner above described, will simply pass out at the bottom of the air-bell 2, and rise to the surface of the fuel in the tank. Inasmuch as the ordinary use of an automobile involves the rounding of many corners each day, it will readily be seen that during all the time that the level of the liquid in the fuel tank is between one quarter full and three quarters full, a continual supply of air is being forced into the air-bell 2, so that any leak in the gauge system is compensated for. Inasmuch as the level of the liquid in the air-bell is thus kept right near the bottom of the air-bell 2, it will readily be understood also that changes of temperature causing expansion and contraction of the air in the air-bell 2, are compensated for and become harmless.

I realize that it would be an advantage to mount the pipe line 4 inside the fuel tank 1, but such a construction would be within the scope of my invention, and I will not, therefore, described the manner in which this may be done.

It will also be understood that the actual potential head of the liquid surrounding the pipe 5 when a corner is turned sharply is greater than represented by the dotted line B B, because the liquid under such circumstances would have a tendency to rise above the top of the fuel tank 1. were it permitted so to do. Thus it is easy when turning a corner to secure a greater head in the pipe 5, than exists in the pipe 10 and air-bell 2, especially when the fuel tank is not over three quarters full of fuel.

Having thus described my invention, what I claim as new and desire to secure by Letters Patent is:

1. In combination with a liquid fuel tank, a pressure gauge air-bell mounted in the tank and having an opening communicating with the liquid at the depth to be gauged; a secondary air-bell mounted in the tank, the secondary air-bell having an opening in the lower end thereof; said air-bells being spaced apart horizontally and materially distant one from the other whereby slopping about of fuel in the tank may uncover the opening in the secondary air-bell and cause a difference in the pressure exerted in said air-bells; a pipe line connecting said air-bells and opening into the pressure gauge air-bell near the bottom thereof, whereby air will pass from the secondary air-bell into the air-bell for the pressure gauge when the slopping of the liquid in the tank causes a greater pressure to be exerted in the secondary air-bell than is exerted in the air-bell for the pressure gauge.

2. In combination with a liquid fuel tank, a pressure gauge air-bell mounted in the tank and having an opening communicating with the liquid at the depth to be gauged; a secondary air-bell mounted in the tank; the secondary air-bell having an opening in the lower portion thereof, said opening being at a different level in the tank than the opening in the pressure gauge air-bell; said air-bells being spaced apart horizontally a distance from each other whereby slopping about of fuel in the tank may uncover the opening in the secondary air-bell and cause a difference in the pressure exerted in said air-bells; a pipe line connecting the air-bells, and opening into the pressure gauge air-bell near the bottom thereof whereby air will pass from the secondary air-bell into the air-bell for the pressure gauge when the movements of the liquid in the tank cause a greater pressure to be exerted in the secondary air-bell than is at that time exerted in the air-bell for the pressure gauge.

OSCAR L. INGRAM.